(12) United States Patent
Liu et al.

(10) Patent No.: US 12,502,829 B2
(45) Date of Patent: Dec. 23, 2025

(54) 3D PRINTER EXTRUSION STRUCTURE

(71) Applicant: Shenzhen Creality 3D Technology Co., Ltd., Shenzhen (CN)

(72) Inventors: Huilin Liu, Shenzhen (CN); Jingke Tang, Shenzhen (CN); Chun Chen, Shenzhen (CN); Danjun Ao, Shenzhen (CN); Dajiang Wu, Shenzhen (CN)

(73) Assignee: Shenzhen Creality 3D Technology Co., Ltd., Shenzhen (CN)

( * ) Notice: Subject to any disclaimer, the term of this patent is extended or adjusted under 35 U.S.C. 154(b) by 128 days.

(21) Appl. No.: 18/515,602

(22) Filed: Nov. 21, 2023

(65) Prior Publication Data
US 2024/0083111 A1 Mar. 14, 2024

Related U.S. Application Data

(63) Continuation-in-part of application No. PCT/CN2021/100450, filed on Jun. 16, 2021.

(30) Foreign Application Priority Data

May 21, 2021 (CN) .......................... 202110560451.0

(51) Int. Cl.
*B29C 64/209* (2017.01)
*B29C 64/295* (2017.01)
*B33Y 30/00* (2015.01)

(52) U.S. Cl.
CPC .......... *B29C 64/209* (2017.08); *B29C 64/295* (2017.08); *B33Y 30/00* (2014.12)

(58) Field of Classification Search
None
See application file for complete search history.

(56) References Cited

U.S. PATENT DOCUMENTS

2019/0193331 A1   6/2019   Welling

FOREIGN PATENT DOCUMENTS

| CN | 204309267 U | * | 5/2015 |
| CN | 107584755 A |   | 1/2018 |
| CN | 208946698 U | * | 6/2019 |
| CN | 110497617 A |   | 11/2019 |
| CN | 212194228 U |   | 12/2020 |
| CN | 112659558 A | * | 4/2021 |
| KR | 101477951 B1 |   | 12/2014 |
| KR | 101853431 B1 |   | 4/2018 |

* cited by examiner

*Primary Examiner* — Mohammad M Ameen
(74) *Attorney, Agent, or Firm* — ScienBiziP, P.C.

(57) ABSTRACT

A 3D printer extrusion structure, comprising: a housing; a motor provided on the housing; an active extrusion gear provided in the housing and connected to the motor; an adjusting support rotatably connected inside the housing; a driven extrusion gear provided at one end of the adjusting support and rotatably connected to the adjusting support; and an elastic member, the elastic member being connected to an other end of the adjusting support to enable the end of the adjusting support provided with the driven extrusion gear to approach the active extrusion gear, so that the driven extrusion gear works in conjunction with the active extrusion gear to extrude material, wherein the end of the adjusting support provided with the driven extrusion gear extends to the outside of the housing.

18 Claims, 9 Drawing Sheets

3D PRINTER EXTRUSION STRUCTURE

FIELD

The present application relates to the technical field of 3D printing, particularly to a 3D printer extrusion structure.

BACKGROUND

In 3D printers, extrusion structure refers to a structure that heats and extrudes materials from the nozzle, located at the nozzle of the 3D printer. The stability of the extrusion structure plays a key role in the printing quality and stability. Traditional extrusion structures have large volumes and weights, which not only take up a lot of space and are costly, but also cause heavy loads on the printer due to their large volumes and weights, making them unsuitable for near-end and ultra-near-end printing. In addition, some existing extrusion structures use single gear to feed material, resulting in uneven feeding and poor stability and accuracy of feeding.

Figure 1:
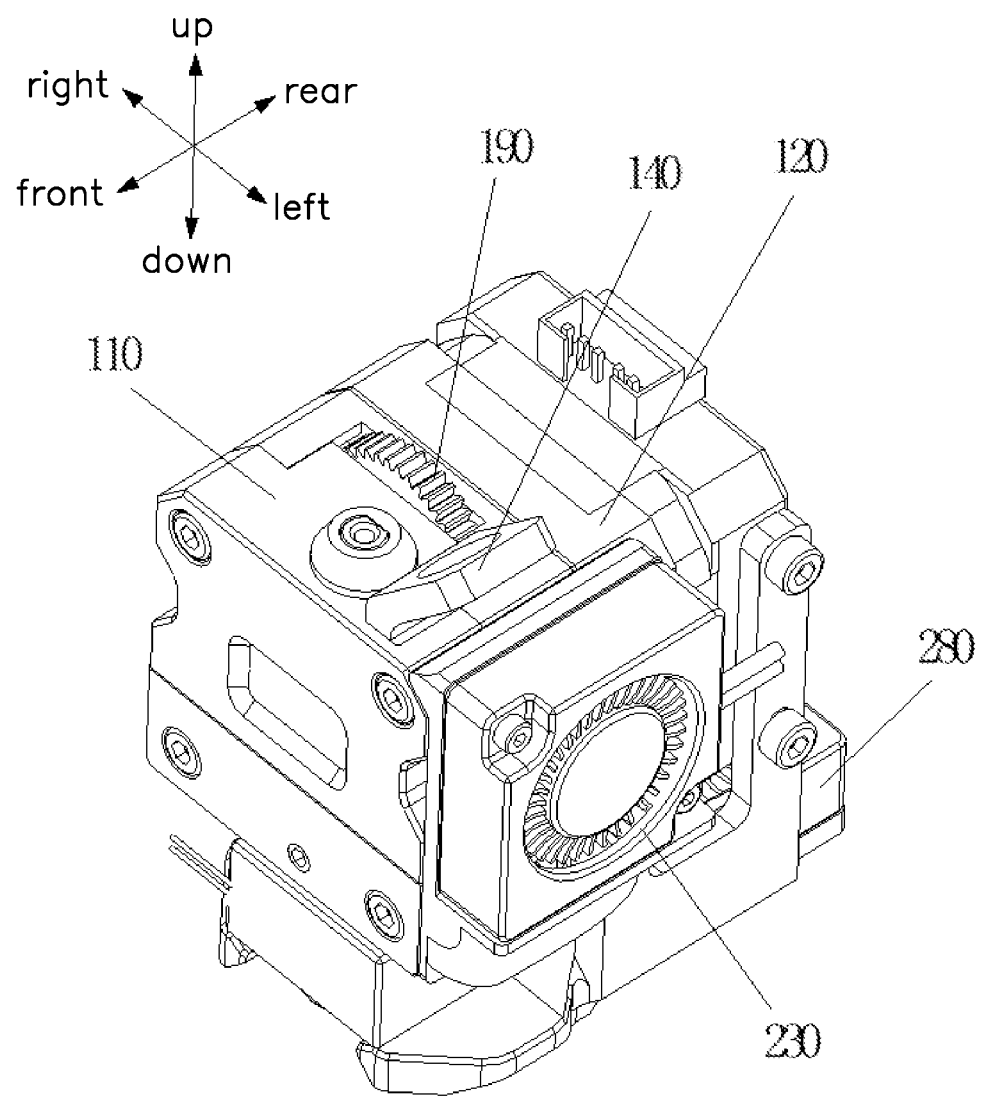
FIG. 1 is a schematic drawing of a 3D printer extrusion structure according to an embodiment of the present disclosure.

DESCRIPTION OF MAIN COMPONENTS OR ELEMENTS 101 material; 110 housing; 111 front shell; 112 rear shell; 113 positioning structure; 120 motor; 130 active extrusion gear; 131 first rotating pin; 132 rotating axis; 140 adjusting support; 141 installation screw; 142 limit structure; 143 first end; 144 second end; 145 third end; 146 first side; 147 second side; 150 driven extrusion gear; 151 second rotating pin; 152 first plastic flange bearing; 153 second plastic flange bearing; 160 elastic member; 170 motor gear; 180 gear shaft; 181 bearing; 190 reduction gear; 200 heat dissipation member; 210 first discharge pipe; 211 second discharge pipe; 212 feeding guide; 220 throat pipe; 230 first heat dissipation fan; 240 first air guide member; 241 first air guide opening; 250 heating block; 251 thermal insulator; 252 thermistor; 260 nozzle; 270 heating rod; 280 second heat dissipation fan; 290 second air guide member; 291 second air guide opening.

DETAILED DESCRIPTION

In conjunction with the drawings in the present application, the technical solutions in the embodiments of the present application will be described clearly and comprehensively. Specific embodiments described herein are merely illustrative of the present application and not intended to limit the scope of the present application. Furthermore, it should be noted that for the sake of clarity, only the portion of the structure related to the present structure is shown in the attached figures rather than the entire structure.

The present application discloses a 3D printer extrusion structure, referring to FIG. 1 to FIG. 6, the 3D printer extrusion structure includes a housing 110, a motor 120, an active extrusion gear 130, an adjusting support 140, a driven extrusion gear 150, and an elastic member 160. The housing 110 includes a front shell 111 and a rear shell 112. quantity of components of the housing 110 may be adjusted as required. For example, the housing 110 may include multiple segmented shells that are spliced together, without limitation here.

The motor 120 is provided on the housing 110. In an embodiment, the motor 120 is positioned at a rear side of the housing 110, and the motor 120 is positioned outside the housing 110. The housing 110 is positioned and installed through positioning holes on a case of the motor 120. A rotor of the motor 120 is inserted into the housing 110, and the active extrusion gear 130 is arranged inside the housing 110 and connected to the rotor of the motor 120, so that the motor 120 can drive the active extrusion gear 130 to rotate. The active extrusion gear 130 can be directly connected to the motor 120 or indirectly connected through other intermediate transmission structures. In the present application, the active extrusion gear 130 and the motor 120 are indirectly connected.

Figure 2:
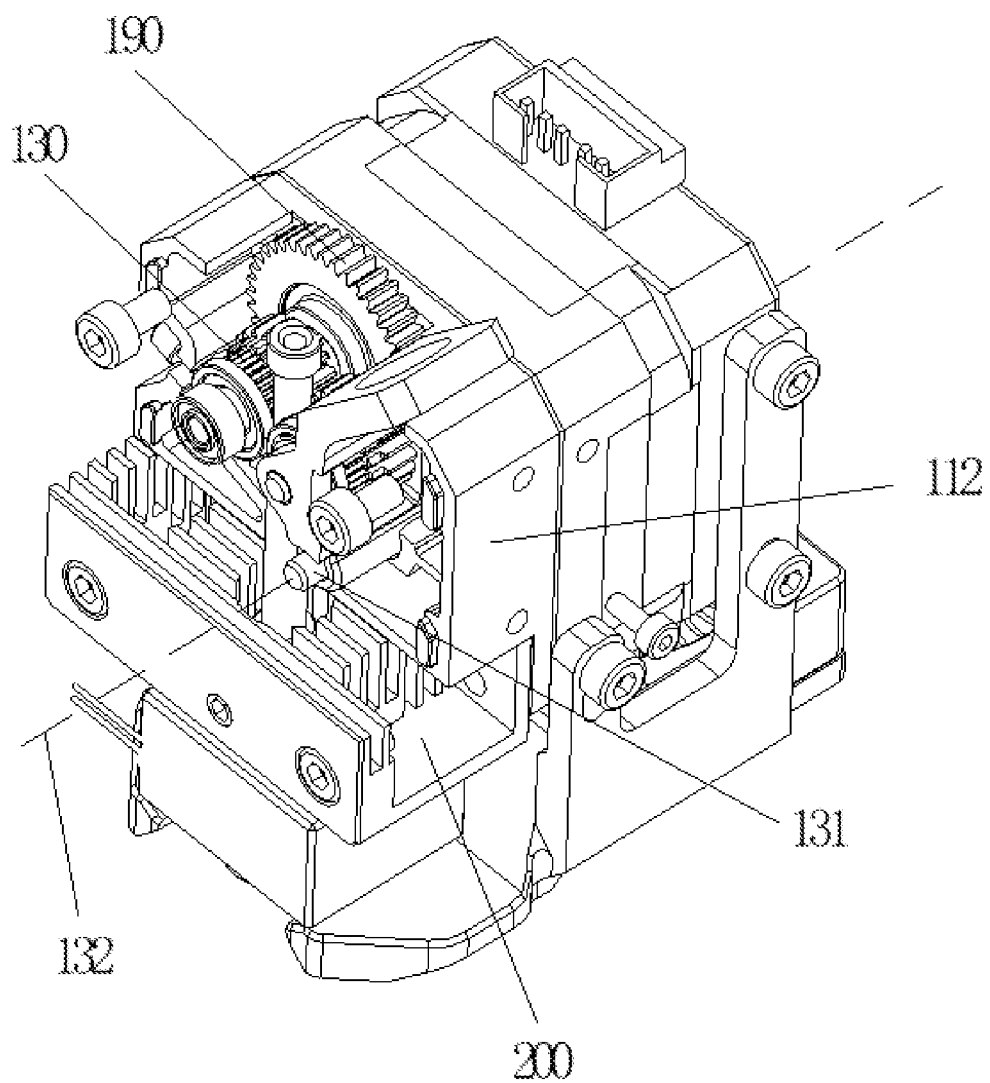
FIG. 2 is a schematic drawing of inside structure of the 3D printer extrusion structure.
Figure 3:
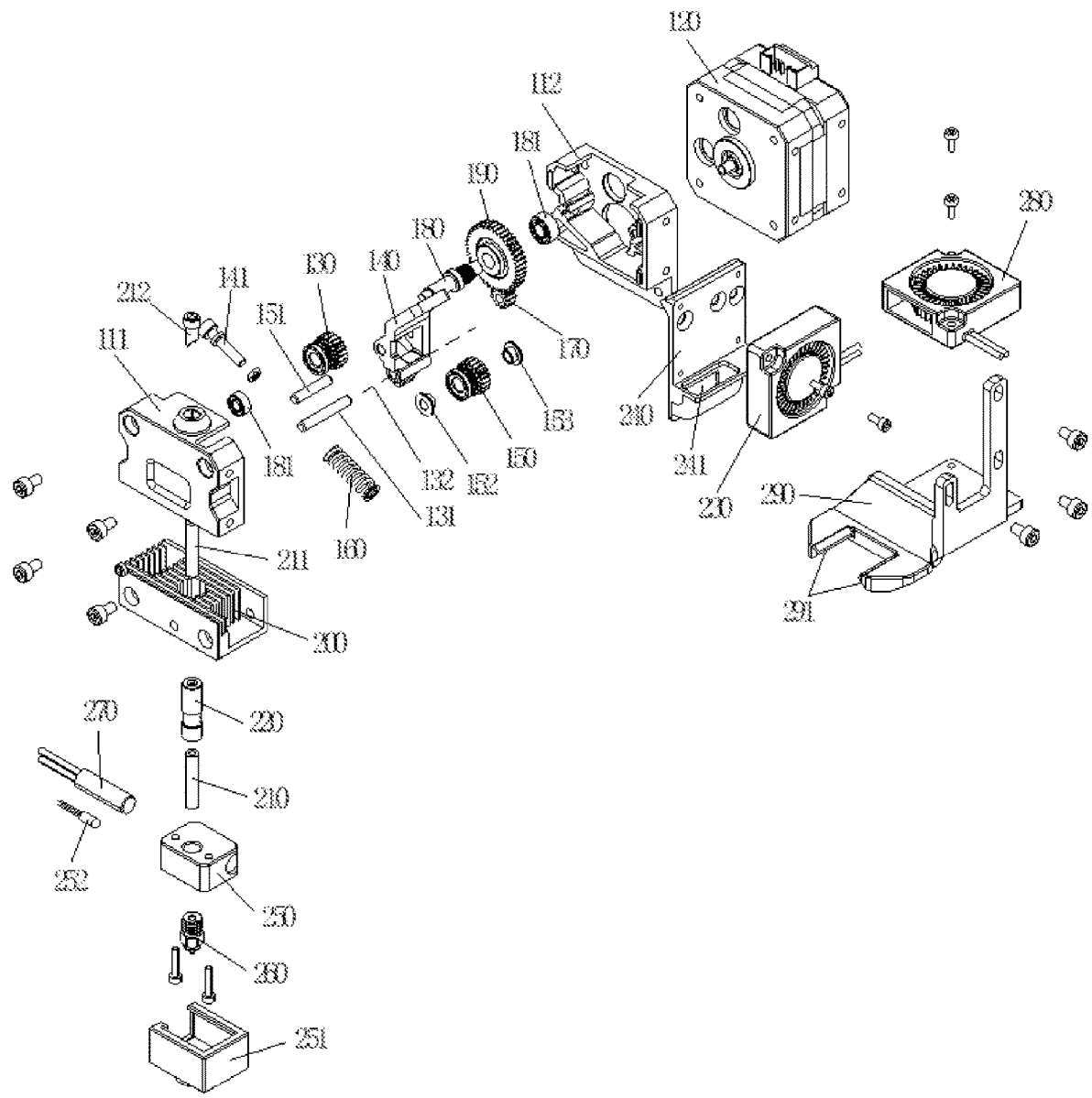
FIG. 3 is an explosion view of the 3D printer extrusion structure.
Figure 6:
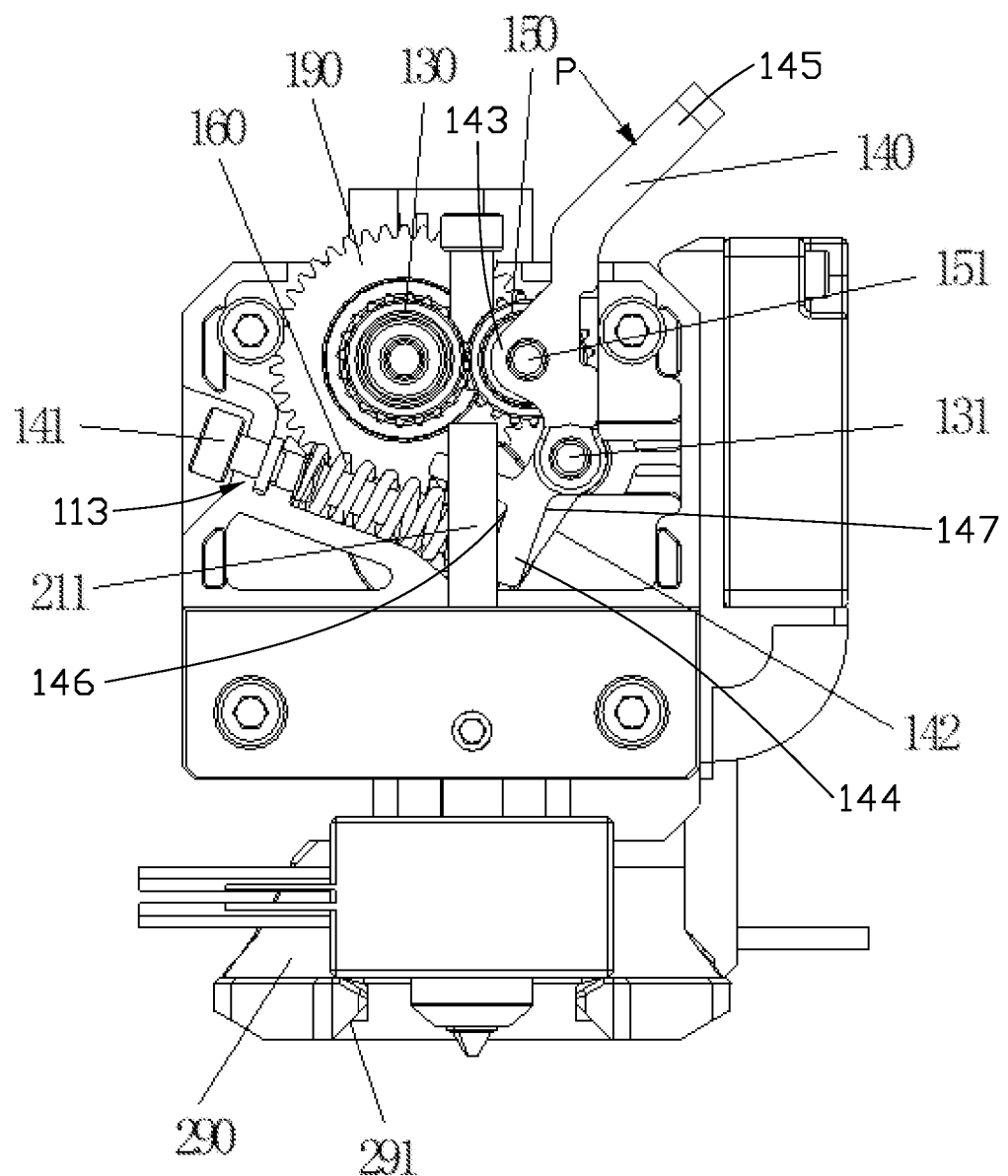
FIG. 6 is a front view the 3D printer extrusion structure in FIG. 2.

The adjusting support 140 is rotatably connected to the housing 110. Referring to FIG. 2 and FIG. 3, the adjusting support 140 is rotatably connected to the housing 110 through a first rotating pin 131, so that the adjusting support 140 can rotate around a rotating axis 132. Preferably, one end of the first rotating pin 131 is supported on the front shell 111, and the other end of the first rotating pin 131 is supported on the rear shell 112. As shown in FIG. 6, the adjusting support 140 includes a first end 143, a second end 144, and a third end 145. The first end 143 and the second end 144 are received in the housing 110, and the third end 145 is out of the housing 110. The first end 143 faces the active extrusion gear 130, and is between the second end 144 and the third end 145. The first rotating pin 131 is between the first end 143 and the second end 144. the driven extrusion gear 150 is set on the first end 143 of the adjusting support 140 and is rotatably connected to the adjusting support 140. The driven extrusion gear 150 can rotate on the adjusting support 140 to realize material extrusion. The elastic member 160 is arranged at a side of the second end 144 towards the active extrusion gear 130. An end of the elastic member 160 is connected to the housing 110, an other end of the elastic member 160 is connected to the second end 144 of the adjusting support 140. The elastic member 160 enables the first end 143 of the adjusting support 140 provided with the driven extrusion gear 150 to approach the active extrusion gear 130, so that the driven extrusion gear 150 works in conjunction with the active extrusion gear 130 to extrude material. Material 101 is abutted against between the active extrusion gear 130 and the driven extrusion gear 150, and is extruded outward with the rotation of the gears. By using the feeding method of a combination of the active extrusion gear 130 and the driven extrusion gear 150, feeding of the 3D printer extrusion structure disclosed herein is stable and accurate.

Figure 8:
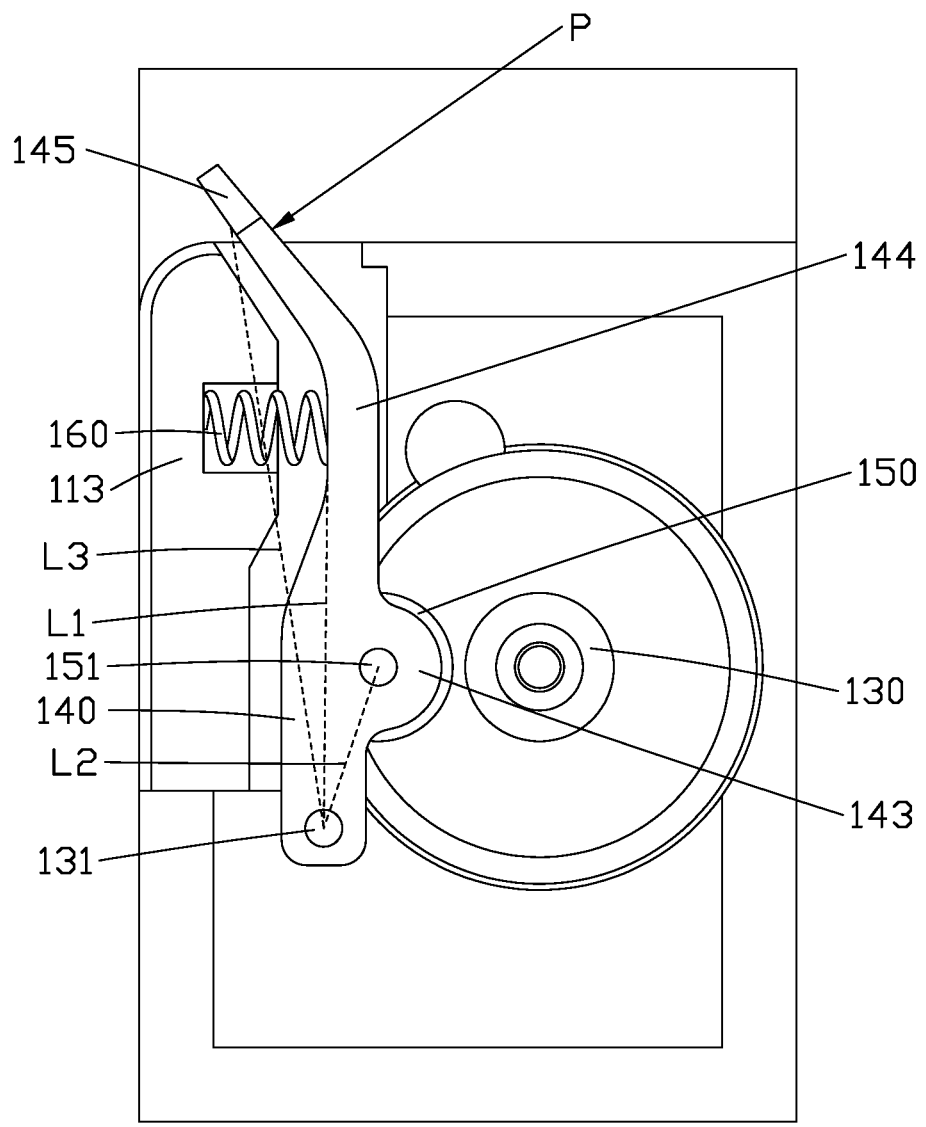
FIG. 8 is a schematic drawing of the 3D printer extrusion structure in one embodiment.

Referring to FIG. 8, in one embodiment, the second end 144 is between the first end 143 and the third end 145. The elastic member 160 can be arranged at a side of the second end 144 away from the active extrusion gear 130, and the elastic member 160 can be connected between the second end 144 and a positioning structure 113 of the housing 110. The first rotating pin 131 is arranged at a bottom end of the adjusting support 140, and the first end 143 is between the first rotating pin 131 and the second end 144.

Figure 9:
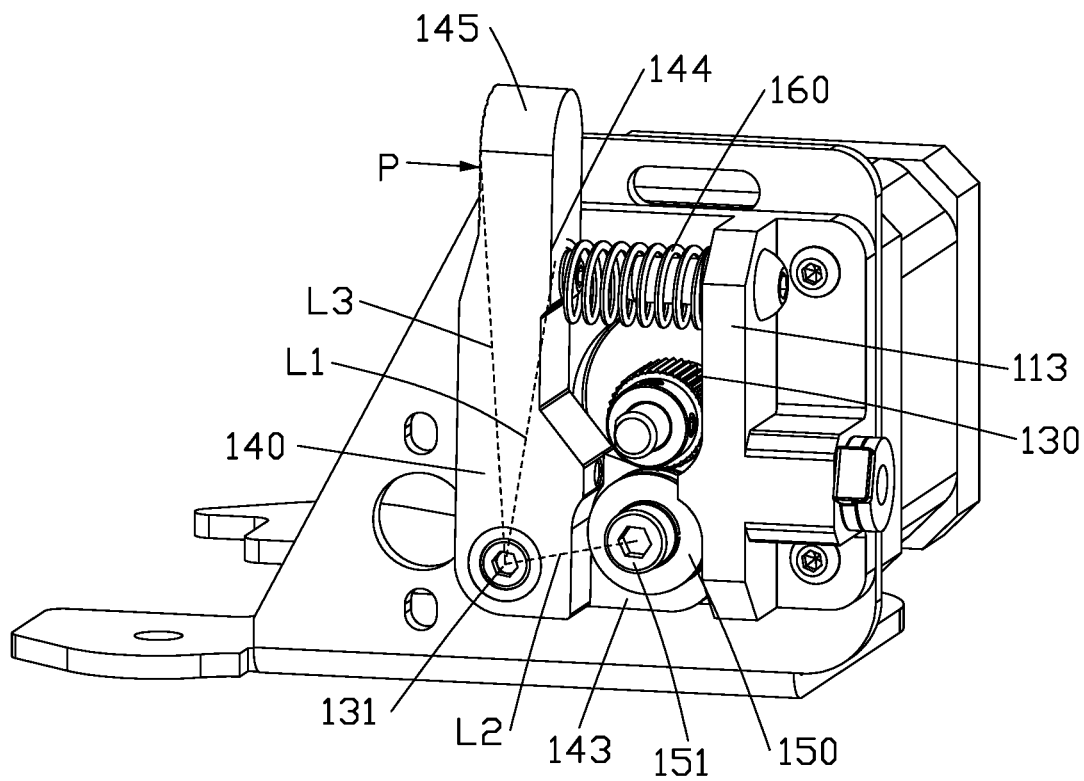
FIG. 9 is a schematic drawing of the 3D printer extrusion structure in one embodiment.

Referring to FIG. 9, in one embodiment, the second end 144 is between the first end 143 and the third end 145. The adjusting support 140 can be a L shaped structure. The elastic member 160 can be arranged at the side of the second end 144 towards the active extrusion gear 130, and the elastic member 160 can be connected between the second end 144 and a positioning structure 113 of the housing 110. The first rotating pin 131 is arranged between the first end 143 and the second end 144, and the first rotating pin 131 is arranged at a corner of the L shaped structure of the adjusting support 140.

Figure 4:
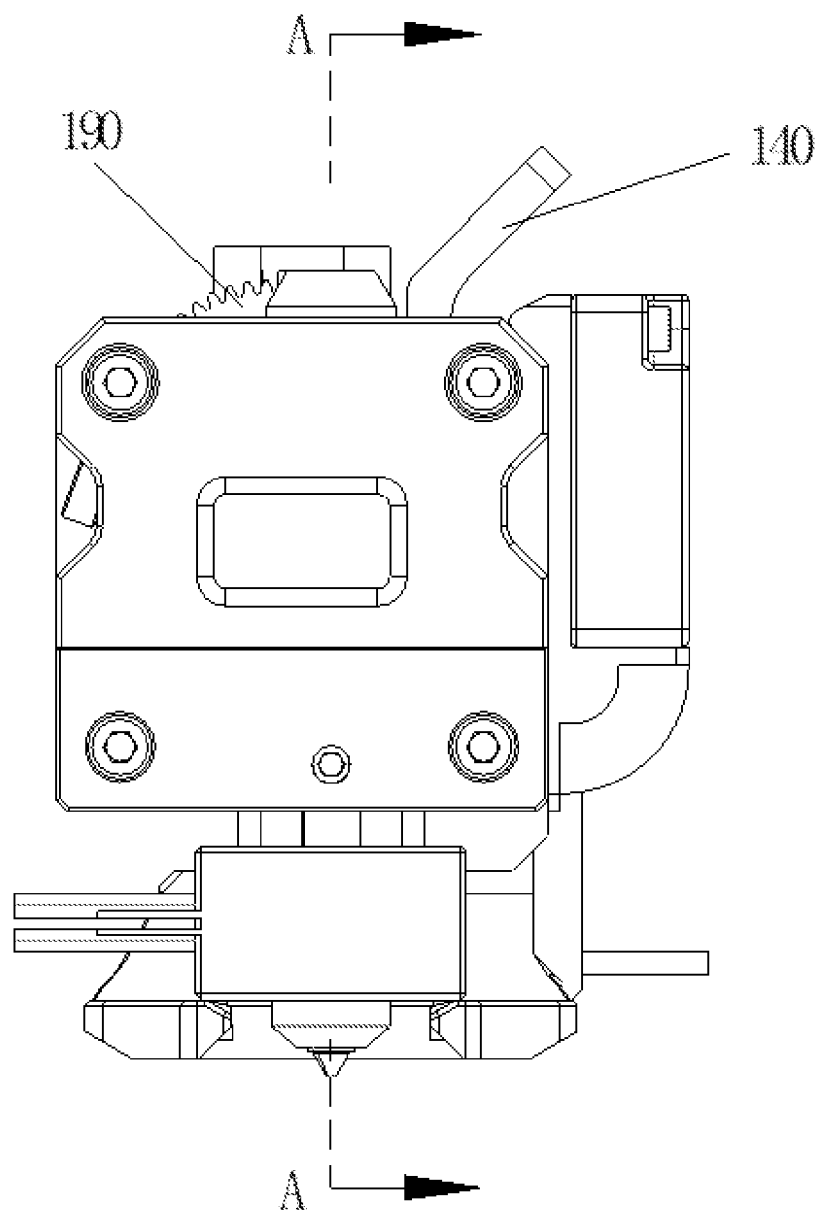
FIG. 4 is a front view of the 3D printer extrusion structure.
Figure 7:
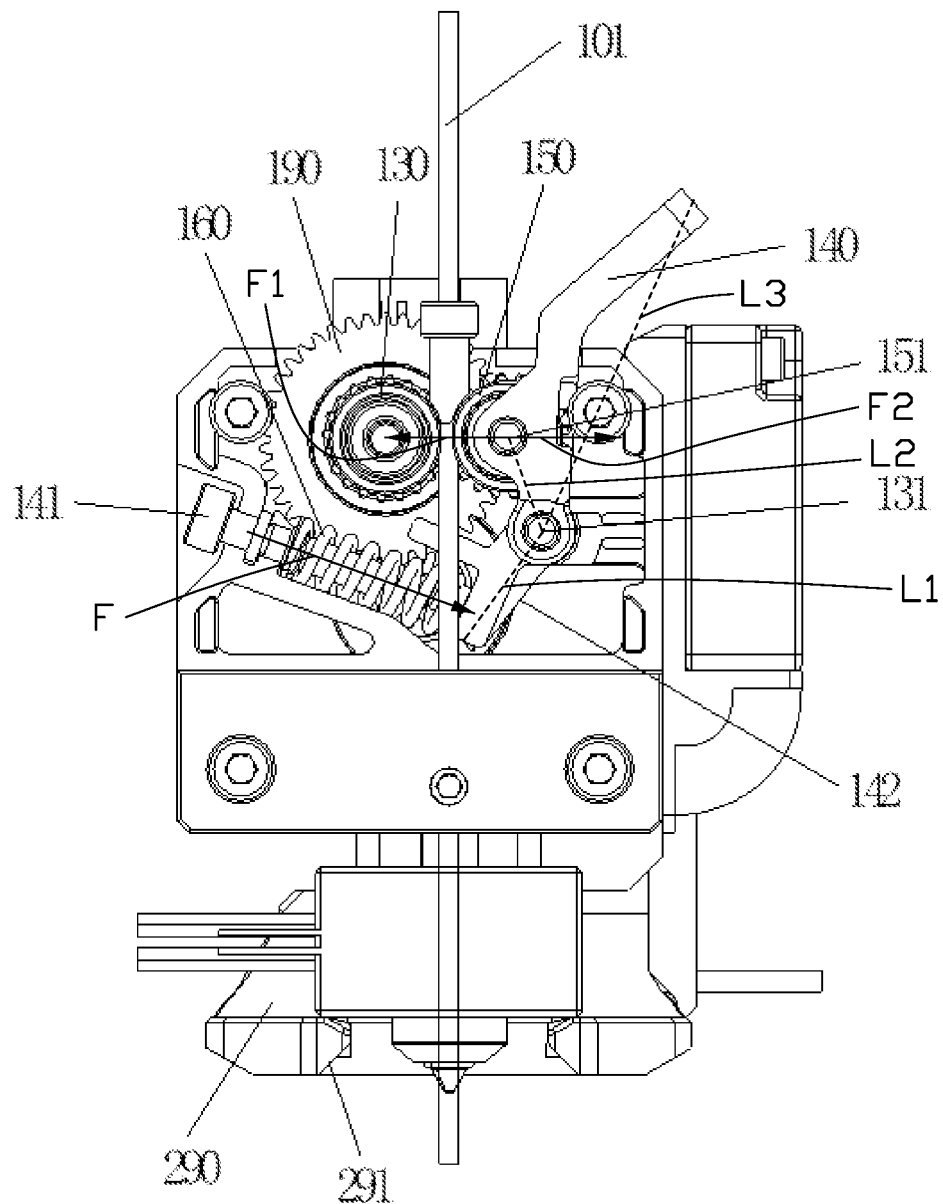
FIG. 7 is a schematic drawing of the 3D printer extrusion structure when feeding in a material.

Referring to FIG. 4 and FIG. 6, the third end 145 of the adjusting support 140 protrudes out of the housing 110, to form a driving lever outside the housing 110. By manipulating the driving lever, the adjusting support 140 can be moved to rotate clockwise around the rotating axis 132, as shown in FIG. 7, which causes the driven extrusion gear 150 to separate from the active extrusion gear 130, allowing the material 101 to be fed between the driven extrusion gear 150 and the active extrusion gear 130. During the manipulation of the adjusting support 140, the elastic member 160 is compressed. Once the material 101 has been fed through, the adjusting support 140 can be released and moves back to its original position by the force of the elastic member 160, causing the driven extrusion gear 150 to re-engage with the active extrusion gear 130, which abuts against the material 101 and can start feeding. In other words, in the 3D printer extrusion structure of the present application, the adjusting support 140 can be manipulated outside the housing 110 to complete the feeding operation, which is convenient and quick. Furthermore, the 3D printer extrusion structure of the present application is small in size and light in weight, which allows for miniaturization and lightweight construction of the extrusion structure, making it suitable for near-end and ultra-near-end printing.

Referring to FIG. 6, FIG. 7, FIG. 8, and FIG. 9, the first rotating pin 131 is a pivot point of the adjusting support 140. A first lever arm L1 is formed between the first rotating pin 131 and the second end 144. A second lever arm L2 is formed between the first rotating pin 131 and a rotating axis of the driven extrusion gear 150 on the first end 143. A third lever arm L3 is formed between the third end 145 and the first rotating pin 131. A length of the first lever arm L1 is greater than a length of the second lever arm L2. The elastic member 160 can apply a compressive force F on the second end 144 to make the second end 144 close to the active extrusion gear 130, so that the driven extrusion gear 150 can apply a first pressing force F1 on the material 101. F2 is a reaction force acting on the driven extrusion gear 150. The first pressing force F1 is great than the compressive force F generated by the elastic member 160, due to the first lever arm L1 is longer than the second lever arm L2. Furthermore, a length of the third lever arm L3 is greater than the length of the first lever arm L1. When the third end 145 is pressed by a force P as shown in FIG. 6, since the third lever arm L3 is longer than the first lever arm L1, a force applied on the elastic member 160 by the second end 144 is greater than the force P, so that the elastic member 160 can be compressed easily, and the adjusting support 140 can rotate clockwise to separate the driven extrusion gear 150 from the active extrusion gear 130. Therefore, when the material 101 needs to be pulled out or fed in, a small force P applied to the third end 145 can move the driven extrusion gear 150 away from the active extrusion gear 130, which improves user experience.

Furthermore, referring to FIG. 3 and FIG. 6, the driven extrusion gear 150 is connected to the first end 143 of the adjusting support 140 through a second rotating pin 151. Specifically, front and rear ends of the driven extrusion gear 150 are respectively pressed into a first plastic flange bearing 152 and a second plastic flange bearing 153, then the second rotating pin 151 is produced through the driven extrusion gear 150, the first plastic flange bearing 152, and the second plastic flange bearing 153, and both ends of the second rotating pin 151 are supported on the front and rear sides of the first end 143 of the adjusting support 140.

Referring to FIG. 6, the 3D printer extrusion structure of the present application further includes an installation screw 141, and a positioning structure 113 for mounting the installation screw 141 is provided inside of the housing 110. The installation screw 141 is installed in the positioning structure 113. The elastic member 160 can be connected to the housing 110 by the installation screw 141 and the positioning structure 113. In one embodiment, the elastic member 160 may be a spring that is sleeved on the installation screw 141, so that the spring can be guide by the installation screw 141. As shown in FIG. 6, one end of the spring is mounted on the installation screw 141, an other end of the spring can connect the adjusting support 140, and the spring can abut against the adjusting support 140, causing the spring to push the adjusting support 140 towards the active extrusion gear 130. When material needs to be fed in, the adjusting support 140 can be pressed by a force P in FIG. 6 to separate the driven extrusion gear 150 from the active extrusion gear 130, to allow the material 101 to be protruded between them. During the pressing process, the spring is compressed, and after releasing the adjusting support 140, the adjusting support 140 returns to its original position due to the force of the spring.

Referring to FIG. 6, the second end 145 of the adjusting support 140 has a first side 146 and a second side 147 along its rotational direction. The first side 146 is connected to the elastic member 160. A limiting structure 142 is provided inside the housing 110 corresponding to the second side 147 of the adjusting support 140, to limit movement of the adjusting support 140. In an embodiment, as shown in FIG. 6, the limiting structure 142 is a stop wall surface that can limit the adjusting support 140 to a limit position, to prevent the adjusting support 140 from exerting excessive extrusion force on the active extrusion gear 130 under the force of the spring, and causing the material 101 to break. Meanwhile, the spring applies a pressing force on the adjusting support 140 to prevent the extrusion force from being too small and causing the material 101 to be shaved off.

As shown in FIG. 3, the 3D printer extrusion structure further includes a motor gear 170, a gear shaft 180, and a reduction gear 190. The motor gear 170 is connected to the rotor of the motor 120. The gear shaft 180 is rotatably connected inside the housing 110. As shown in FIG. 3, the gear shaft 180 is rotatably connected inside the housing 110 by a bearing 181. The reduction gear 190 is positioned on the gear shaft 180 and meshes with the motor gear 170. An outer diameter of the reduction gear 190 is greater than an outer diameter of the motor gear 170, so that when the motor gear 170 with smaller diameter meshes with the reduction gear 190 with larger diameter, a one-grade reduction is formed. The active extrusion gear 130 is mounted on the gear shaft 180 and rotates coaxially with the reduction gear 190. After the reduction gear 190 achieves deceleration, the reduction gear 190 transmits the torque to the active extrusion gear 130 through the gear shaft 180. The material 101 is extruded by the cooperation between the active extrusion gear 130 and the driven extrusion gear 150. By using one-grade reduction, the entire 3D printer extrusion structure is simplified, compact in size, and lightweight, achieving miniaturization and lightweight construction. In addition, with fewer reduction grades, only one grade, the motor with a small size can achieve high torque output.

As shown in FIG. 1, a part of outer periphery of the reduction gear 190 passes out of the housing 110, so that the reduction gear 190 can be rotated from the outside of the housing 110. When the material is fed in, the reduction gear 190 can be rotated to assist the material 101 entering the 3D printer extrusion structure.

Figure 5:
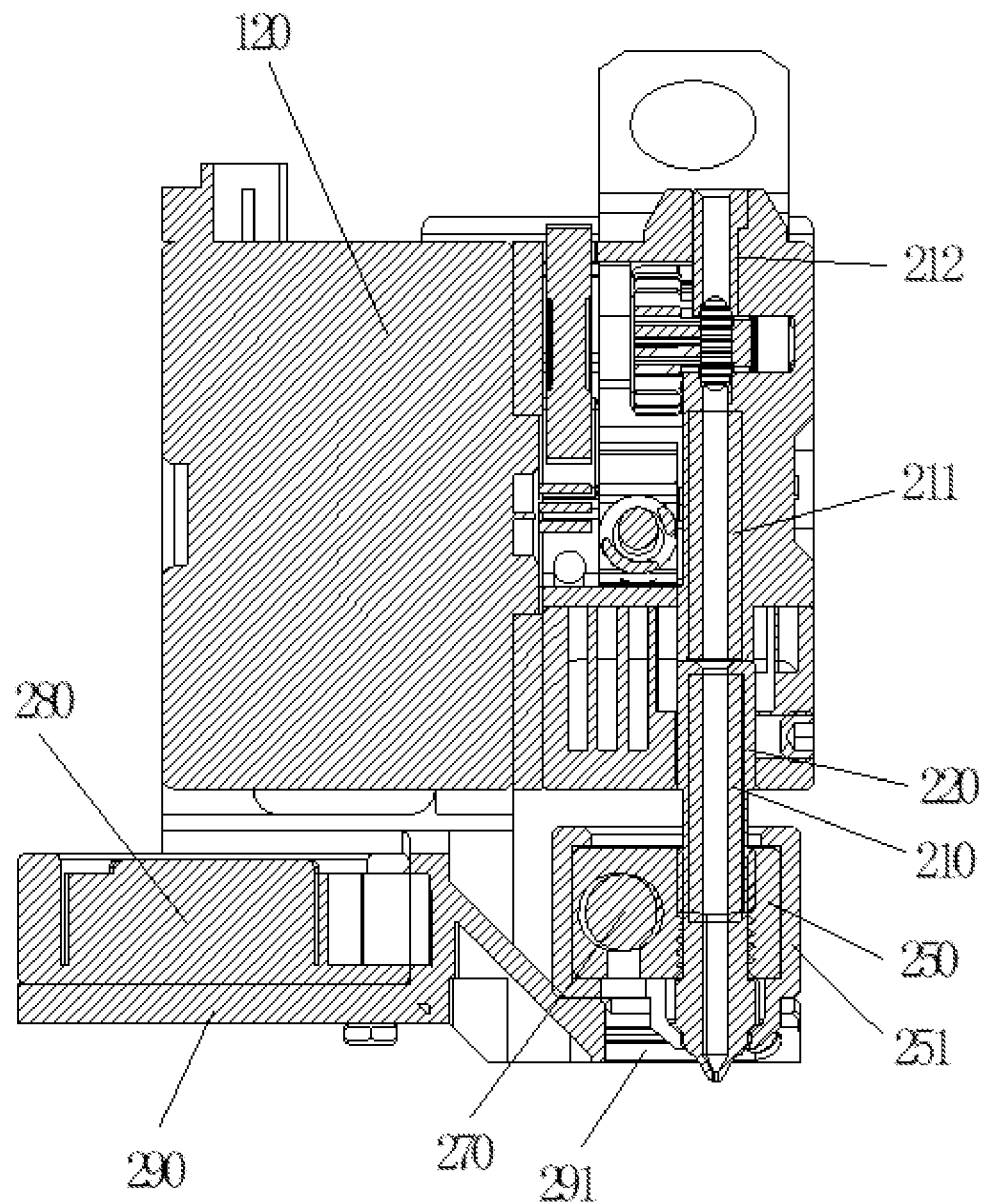
FIG. 5 is a cross-sectional view in A-A direction of the 3D printer extrusion structure in FIG. 4.

Referring to FIG. 2, FIG. 3, and FIG. 5, the 3D printer extrusion structure of the present application further includes a heat dissipation member 200, a first discharge pipe 210, a throat pipe 220, a first heat dissipation fan 230, and a first air guide member 240. The heat dissipation member 200 is positioned below the active extrusion gear 130 and the driven extrusion gear 150, and is located inside the housing 110. The heat dissipation member 200 is integrated on the housing 110, which means the heat dissipation member 200 is integrated into the entire 3D printer extrusion structure, which greatly reduces the volume of the entire machine. In the prior art, the heat dissipation member is separated from the 3D printer extrusion structure, while in the present application, the heat dissipation member 200 is integrated into the entire 3D printer extrusion structure, which greatly reduces the volume of the entire machine. The first discharge pipe 210 is poisoned inside the heat dissipation member 200 and is used for extruding the material 101 of the 3D printer. The discharge pipe is made of Teflon tube, and the material 101 is extruded from the Teflon tube. Specifically, as shown in FIG. 3 and FIG. 5, a second discharge pipe 211 is also provided above the first discharge pipe 210, and a feeding guide 212 is provided above the extrusion gears. The material 101 enters the 3D printer extrusion structure through the feeding guide 212 and is extruded by the extrusion gears, then sequentially passes through the second discharge pipe 211 and the first discharge pipe 210. The throat pipe 220 is sleeved outside the first discharge pipe 210, and one end of the throat pipe 220 contacts the heat dissipation member 200, an other end of the throat pipe 220 contacts the heating block 250, to transfer the heat generated by the heating block 250 to the heat dissipation member 200 for heat dissipation. The first heat dissipation fan 230 and the first air guide member 240 are fixed outside the housing 110. Specifically, the first heat dissipation fan 230 and the first air guide member 240 can be mounted on a left or a right side of the 3D printer extrusion structure. The first air guide member 240 guides the air blown out by the first heat dissipation fan 230 to the heat dissipation member 200. As shown in FIG. 3, in one embodiment, the first heat dissipation fan 230 and the first air guide member 240 are mounted on the left side, and the first air guide member 240 defines a first air guide opening 241, the first air guide opening 241 is located at a left end of the heat dissipation member 200, so that the first heat dissipation fan 230 blows the heat dissipation airflow from the first air guide opening 241 to the heat dissipation member 200. As shown in FIG. 3, the heat dissipation member 200 defines a groove, and a plurality of heat dissipation fins are provided in the groove. The first air guide opening 241 is located at an left end of the groove, and blows the heat dissipation airflow from left to right over the heat dissipation member 200. The heat dissipation member 200 is preferably made of a metal material with good heat dissipation performance, such as aluminum.

As shown in FIG. 3 and FIG. 5, the 3D printer extrusion structure further includes a heating block 250, a nozzle 260, and a heating rod 270. The heating block 250 is arranged below the heat dissipation member 200, and the nozzle 260 is positioned at the bottom of the heating block 250. Specifically, the nozzle 260 can be screwed onto the bottom of the heating block 250, so installation of the nozzle can be completed by tightening the nozzle 260, which is simple and fast. The material 101 passes through the heat dissipation member 200 and the heating block 250 in sequence, and then the material 101 is extruded out from the nozzle 260. The heating rod 270 is set in the heating block 250, configured to heat the material 101 inside the heating block 250. The heating rod 270 is connected to an external power source to realize heating. When the heating rod 270 is powered on, it generates heat and transfers the heat to the heating block 250, thereby heating up the material 101 inside the heating block 250.

In order to improve safety performance, as shown in FIG. 3 and FIG. 5, an thermal insulator 251 can be sleeved on an outer surface of the heating block 250 to prevent people from accidentally touching the heating block 250 and being burned. The thermal insulator 251 can be made of a heat-insulating material, for example, silicone sleeve, plastic sleeve, rubber sleeve, etc.

Additionally, a thermistor 252 is further placed in the heating block 250 to detect a heating temperature, and realize a precise temperature control.

As shown in FIG. 3, FIG. 5, and FIG. 6, the 3D printer extrusion structure further includes a second heat dissipation fan 280 and a second air guide member 290. The second heat dissipation fan 280 and the second air guide member 290 are positioned on the housing 110. In an embodiment, the second heat dissipation fan 280 and the second air guide member 290 are positioned at the rear side of the housing 110, and located below the motor 120, which can fully utilizing the space below the motor 120, and reduce the overall volume of the printer. The second air guide member 290 can guide the air blown by the second heat dissipation fan 280 to a printing model under the extrusion structure. Specifically, as shown in FIG. 3, FIG. 5, and FIG. 6, a left side and a right side of the second air guide member 290 are both provided with second air guide openings 291 facing downwards. The nozzle 160 is between two of the second air guide openings 291. The second air guide openings 291 blows the cooling airflow onto a printing model below the nozzle 260 for cooling the model. The present application adopts a special heat dissipation channel design, which ensures the overall heat dissipation effect while reducing the volume of the printer, thus improving the printing effect.

In the description of the present application, unless explicitly specified and limited, terms such as "connected", "attached", and "fixed" should be broadly interpreted. For example, they can be fixed or detachable, integrated; can be mechanically or electrically connected; can be directly or indirectly connected through an intermediate medium; can be interconnected within two components or through the interaction between two components. Ordinary experts in this field can understand the meaning of these terms in the present application according to specific situations.

In the present application, unless explicitly specified and limited, the first feature being "above" or "below" the second feature can include direct contact between the first and second features, or contact between them through another feature between them. Also, the first feature being "above" the second feature includes the first feature being directly above or diagonally above the second feature or only indicates that the horizontal height of the first feature is higher than that of the second feature. The first feature being "below" the second feature includes the first feature being directly below or diagonally below the second feature or only indicates that the horizontal height of the first feature is lower than that of the second feature.

In the description of this embodiment, terms such as "up", "down", "left", "right", "front", and "rear" are based on the orientation or position relationship shown in the drawings, only for convenience and simplification of the description, not for indicating or implying that the devices or components referred to must have specific orientations, be constructed and operated in specific orientations, and should not be construed as limiting the present application. In addition, the terms "first" and "second" are only used to distinguish in the description and have no special meaning.

Obviously, the above-described embodiments of the present application are only used to illustrate the present application, and are not intended to limit the embodiments of the present application. Ordinary experts in the relevant field can make various obvious changes, adjustments, and substitutions without departing from the scope of the present application. It is impossible and unnecessary to exhaust all possible embodiments of the present application. Any modification, equivalently substituted, or improved embodiments made within the spirit and principles of the present application should be included within the scope of the present application as claimed.

What is claimed is:

1. A 3D printer extrusion structure, comprising:
   a housing, comprises a front shell and a rear shell;
   a motor provided on the housing;
   an active extrusion gear provided in the housing, and the active extrusion gear is connected to the motor;
   an adjusting support rotatably connected in the housing through a first rotating pin, one end of the first rotating pin is supported on the front shell, and another end of the first rotating pin is supported on the rear shell;
   a driven extrusion gear rotatably connected to the adjusting support; and
   an elastic member, an end of the elastic member is connected to the housing, an other end of the elastic member is connected to the adjusting support, to enable the driven extrusion gear to approach the active extrusion gear, make the driven extrusion gear (150) work in conjunction with the active extrusion gear to extrude material;
   wherein the adjusting support comprises a first end, a second end, and a third end integrally connected; the first end and the second end are received in the housing, the third end is out of the housing; the first end faces the active extrusion gear; the driven extrusion gear is rotatably connected to the first end; the elastic member is connected to the second end; the first rotating pin is arranged at a connecting portion between the first end and the second end;
   a second rotating pin produces through the driven extrusion gear, and both ends of the second rotating pin are supported on front and rear sides of the adjusting support.

2. The 3D printer extrusion structure as claimed in claim 1, wherein,
   a first lever arm is formed between the first rotating pin and the second end, a second lever arm is formed between the first rotating pin and a rotating axis of the driven extrusion gear; a length of the first lever arm is greater than a length of the second lever arm.

3. The 3D printer extrusion structure as claimed in claim 1, wherein,
   a third lever arm is formed between the third end and the first rotating pin; a length of the third lever arm is greater than the length of the first lever arm.

4. The 3D printer extrusion structure as claimed in claim 1, wherein, comprising:
   a motor gear connected to the motor;
   a gear shaft rotatably connected in the housing;
   a reduction gear positioned on the gear shaft and meshes with the motor gear, an outer diameter of the reduction gear is greater than an outer diameter of the motor gear, the active extrusion gear is positioned on the gear shaft and rotates coaxially with the reduction gear.

5. The 3D printer extrusion structure as claimed in claim 1, wherein, comprising:
   a heat dissipation member positioned below the active extrusion gear and the driven extrusion gear;
   a first discharge pipe, positioned in the heat dissipation member, configured to extrude the material of the 3D printer;
   a throat pipe sleeved outside of the first discharge pipe, and an end of the throat pipe contacts the heat dissipation member;
   a first heat dissipation fan and a first air guide member, positioned on the housing, the first air guide member guides the air blown out by the first heat dissipation fan to the heat dissipation member.

6. The 3D printer extrusion structure as claimed in claim 5, wherein, comprising:
   a heating block positioned below the heat dissipation member, an other end of the throat pipe contacts the heating block;
   a nozzle positioned at a bottom of the heating block, the material passes through the heat dissipation member and the heating block in sequence, and then the material is extruded out from the nozzle;
   a heating rod positioned in the heating block, configured to heat the material in the heating block.

7. The 3D printer extrusion structure as claimed in claim 4, wherein, a part of outer periphery of the reduction gear passes out of the housing.

8. The 3D printer extrusion structure as claimed in claim 1, wherein, comprising:
   a second heat dissipation fan and a second air guide member positioned on the housing, the second air guide member guides the air blown by the second heat dissipation fan to a printing model under the 3D printer extrusion structure.

9. The 3D printer extrusion structure as claimed in claim 1, wherein, comprising:
   an installation screw, a positioning structure for mounting the installation screw is provided inside of the housing, the installation screw is installed in the positioning structure, the elastic member is sleeved on the installation screw.

10. The 3D printer extrusion structure as claimed in claim 1, wherein, one end of the adjusting support that is connected to the elastic member comprises a first side and a second side along a rotational direction of the adjusting support, the first side is connected to the elastic member, a limiting structure is provided inside the housing corresponding to the second side of the adjusting support, to limit movement of the adjusting support.

11. The 3D printer extrusion structure as claimed in claim 6, wherein, a thermistor is placed in the heating block.

12. The 3D printer extrusion structure as claimed in claim 6, wherein, a thermal insulator is sleeved on an outer surface of the heating block.

13. The 3D printer extrusion structure as claimed in claim 1, wherein, comprising:
   a first plastic flange bearing positioned at a front end of the driven extrusion gear;
   a second plastic flange bearing positioned at a rear end of the driven extrusion gear.

14. The 3D printer extrusion structure as claimed in claim 1, wherein, the third end of the adjusting support protrudes out of the housing, to form a driving lever outside the housing.

15. The 3D printer extrusion structure as claimed in claim 8, wherein, the second heat dissipation fan and the second air guide member are positioned at a rear side of the housing, and located below the motor.

16. The 3D printer extrusion structure as claimed in claim 15, wherein, a left side and a right side of the second air guide member are both provided with second air guide openings, the second air guide openings are faced downwards.

17. The 3D printer extrusion structure as claimed in claim 5, wherein, the heat dissipation member defines a groove, and a plurality of heat dissipation fins are provided in the groove.

18. The 3D printer extrusion structure as claimed in claim 5, wherein, the first air guide member defines a first air guide opening, the first air guide opening is located at an end of the heat dissipation member, the first heat dissipation fan blows heat dissipation airflow from the first air guide opening to the heat dissipation member.

* * * * *